United States Patent
Biskeborn et al.

(10) Patent No.: US 10,014,010 B2
(45) Date of Patent: Jul. 3, 2018

(54) APPARATUS HAVING SELF-HEALING CURRENT-PERPENDICULAR-TO-PLANE READ HEAD

(71) Applicant: International Business Machines Corporation, Armonk, NY (US)

(72) Inventors: Robert G. Biskeborn, Hollister, CA (US); Calvin S. Lo, Saratoga, CA (US); Andrew C. Ting, El Prado, NM (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 15/252,052

(22) Filed: Aug. 30, 2016

(65) Prior Publication Data

US 2018/0061441 A1    Mar. 1, 2018

(51) Int. Cl.
*G11B 5/39* (2006.01)
*G11B 5/31* (2006.01)
*G11B 5/008* (2006.01)
*G11B 5/127* (2006.01)
*G11B 5/40* (2006.01)

(52) U.S. Cl.
CPC .......... *G11B 5/314* (2013.01); *G11B 5/00813* (2013.01); *G11B 5/1278* (2013.01); *G11B 5/39* (2013.01); *G11B 5/3912* (2013.01); *G11B 5/40* (2013.01)

(58) Field of Classification Search
CPC ............ G11B 5/39; G11B 5/3912; G11B 5/40
USPC ....................... 360/319, 320, 323, 324.1, 122
See application file for complete search history.

(56) References Cited

U.S. PATENT DOCUMENTS

| 5,609,948 | A  | * | 3/1997 | David | G11B 5/3106 360/122 |
| 6,879,470 | B2 | * | 4/2005 | Johnson | B82Y 10/00 360/122 |
| 6,935,923 | B2 | * | 8/2005 | Burbank | G11B 5/3906 29/603.09 |
| 7,339,763 | B2 | * | 3/2008 | Flint | G11B 5/31 360/122 |
| 7,898,765 | B2 | * | 3/2011 | Hachisuka | G11B 5/00826 360/122 |
| 8,008,097 | B2 |   | 8/2011 | Parkin | |

(Continued)

OTHER PUBLICATIONS

Sullivan, "The Tribology of Flexible Magnetic Recording Media—the Influence of Wear on Signal Performance," Tribology International vol. 31, No. 8, 1998, pp. 457-464.

(Continued)

*Primary Examiner* — Jefferson Evans
(74) *Attorney, Agent, or Firm* — Zilka-Kotab, P.C.

(57) ABSTRACT

An apparatus according to one embodiment includes a substrate having a media bearing surface, and a first shield above the substrate. The first shield has a media facing side recessed from a plane extending along the media bearing surface of the substrate. A current-perpendicular-to-plane sensor is located above the substrate, the sensor having a media facing side recessed from the plane extending along the media bearing surface of the substrate. An electrically nonconductive first film is positioned on the media facing sides of the first shield and sensor. A second film is positioned on a media facing side of the first film, the second film comprising a refractory metal.

20 Claims, 10 Drawing Sheets

(56) References Cited

U.S. PATENT DOCUMENTS

| | | | |
|---|---|---|---|
| 8,009,386 B2* | 8/2011 | Hachisuka | G11B 5/3106 360/122 |
| 8,318,242 B2 | 11/2012 | Bradshaw et al. | |
| 8,547,665 B2* | 10/2013 | Biskeborn | G11B 5/3116 360/122 |
| 8,553,352 B2 | 10/2013 | Biskeborn et al. | |
| 8,638,645 B1* | 1/2014 | Nishijima | G11B 5/1272 369/13.13 |
| 8,780,496 B2* | 7/2014 | Biskeborn | G11B 5/00826 360/122 |
| 8,837,082 B2* | 9/2014 | Biskeborn | G11B 5/00826 360/121 |
| 9,053,718 B1* | 6/2015 | Adrong | G11B 5/00826 |
| 9,147,407 B2 | 9/2015 | Tian et al. | |
| 9,299,369 B1* | 3/2016 | Biskeborn | G11B 5/40 |
| 2002/0048114 A1* | 4/2002 | Dirne | G11B 5/102 360/110 |
| 2008/0266711 A1* | 10/2008 | Nibarger | G11B 5/00821 360/130.21 |
| 2009/0274836 A1 | 11/2009 | Bradshaw et al. | |
| 2012/0084969 A1* | 4/2012 | Tanaka | G11B 5/6088 29/603.01 |
| 2012/0142100 A1* | 6/2012 | Nudler | C07K 14/4705 435/375 |
| 2013/0148237 A1 | 6/2013 | Biskeborn et al. | |
| 2014/0016225 A1* | 1/2014 | Dee | G11B 5/3106 360/75 |
| 2014/0063646 A1* | 3/2014 | Biskeborn | G11B 5/0083 360/75 |
| 2014/0272471 A1 | 9/2014 | Tian et al. | |
| 2014/0293472 A1 | 10/2014 | Balamane et al. | |

OTHER PUBLICATIONS

Goldade, "Micro/Nanoscale Tribology of Linear Tape Drives," Ohio State University, Department of Mechanical Engineering, 2003, pp. 1-209.

Scott, "Micro/Nanoscale Differential Wear and Corrosion of Multiphase Materials," Ohio State University, Department of Mechanical Engineering, 2001, pp. 1-186.

Wikipedia, "Titanium Alloy," Retrieved from https://en.wikipedia.org/wiki/Titanium_alloy on Jul. 20, 2016, pp. 1-7.

* cited by examiner

APPARATUS HAVING SELF-HEALING CURRENT-PERPENDICULAR-TO-PLANE READ HEAD

BACKGROUND

The present invention relates to data storage systems, and more particularly, this invention relates to magnetic recording heads.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

An apparatus according to one embodiment includes a substrate having a media bearing surface, and a first shield above the substrate. The first shield has a media facing side recessed from a plane extending along the media bearing surface of the substrate. A current-perpendicular-to-plane sensor is located above the substrate, the sensor having a media facing side recessed from the plane extending along the media bearing surface of the substrate. An electrically nonconductive first film is positioned on the media facing sides of the first shield and sensor. A second film is positioned on a media facing side of the first film, the second film comprising a refractory metal.

An apparatus according to another embodiment includes a substrate having a media bearing surface, and a first shield above the substrate, the first shield having a media facing side recessed from a plane extending along the media bearing surface of the substrate. A current-perpendicular-to-plane sensor is positioned above the substrate, the sensor having a media facing side recessed from the plane extending along the media bearing surface of the substrate. An electrically nonconductive first film is positioned on the media facing sides of the first shield and sensor, a second film is positioned on a media facing side of the first film, and a third film is positioned on a media facing side of the second film.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a substrate having a media bearing surface, and a first shield above the substrate. The first shield has a media facing side recessed from a plane extending along the media bearing surface of the substrate. A current-perpendicular-to-plane sensor is located above the substrate, the sensor having a media facing side recessed from the plane extending along the media bearing surface of the substrate. An electrically nonconductive first film is positioned on the media facing sides of the first shield and sensor. A second film is positioned on a media facing side of the first film, the second film comprising a refractory metal.

In another general embodiment, an apparatus includes a substrate having a media bearing surface, and a first shield above the substrate, the first shield having a media facing side recessed from a plane extending along the media bearing surface of the substrate. A current-perpendicular-to-plane sensor is positioned above the substrate, the sensor having a media facing side recessed from the plane extending along the media bearing surface of the substrate. An electrically nonconductive first film is positioned on the media facing sides of the first shield and sensor, a second film is positioned on a media facing side of the first film, and a third film is positioned on a media facing side of the second film.

Figure 1A:
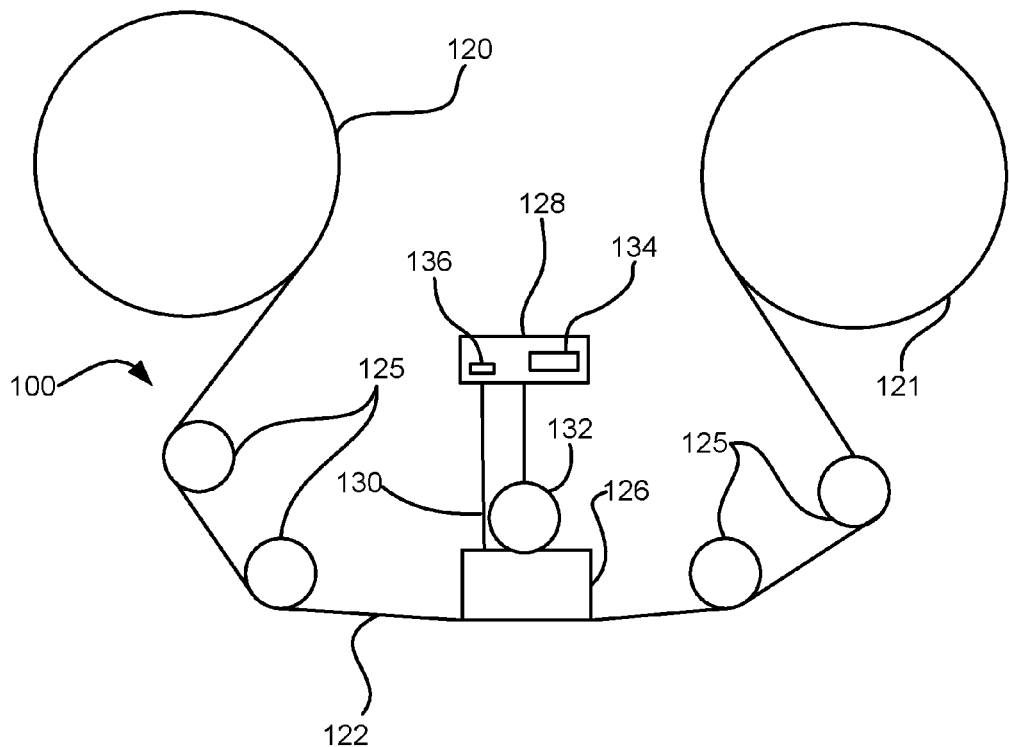
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
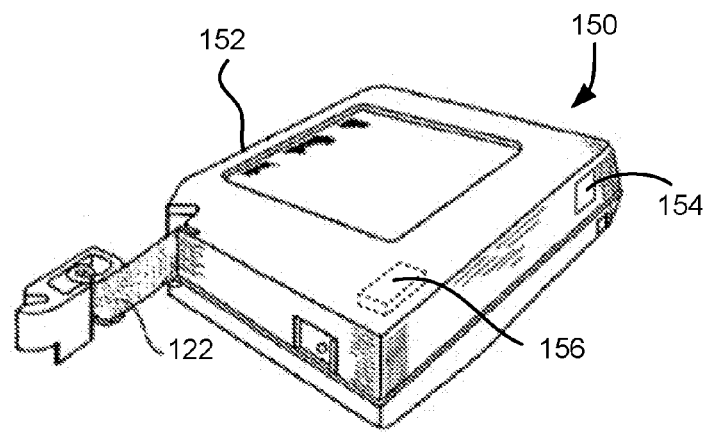
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
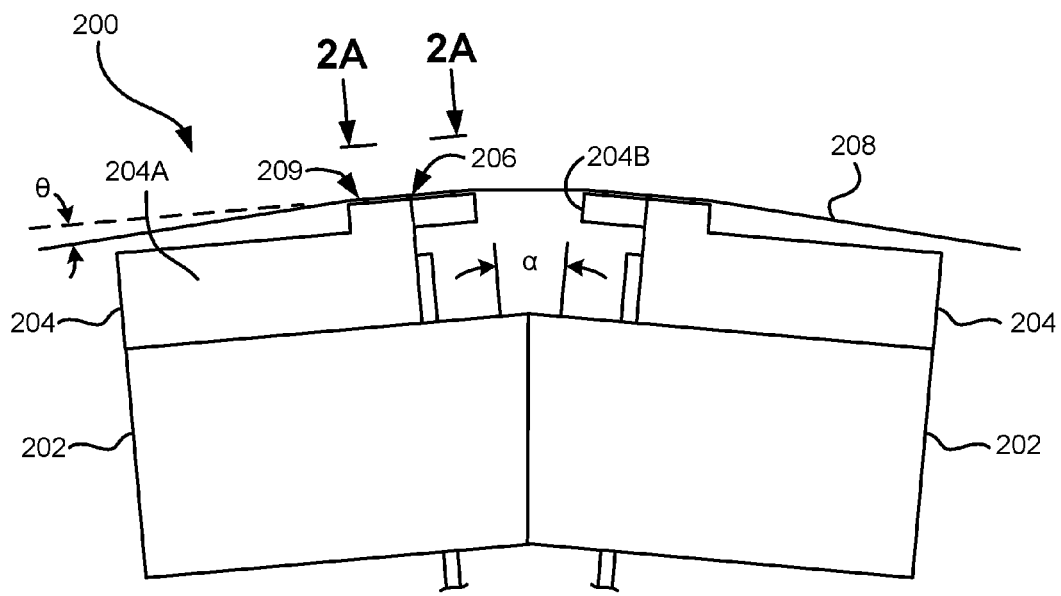
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
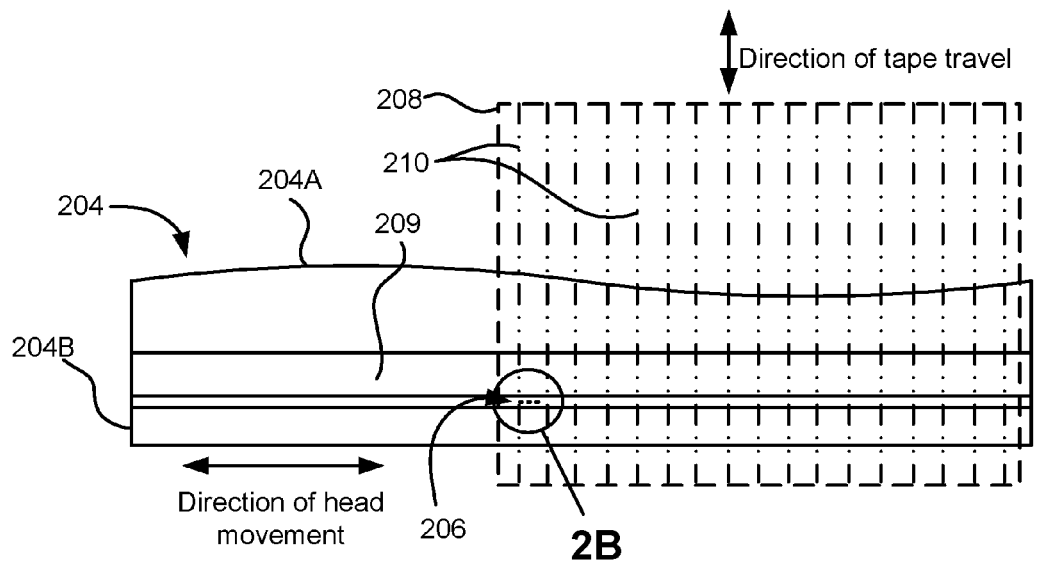
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
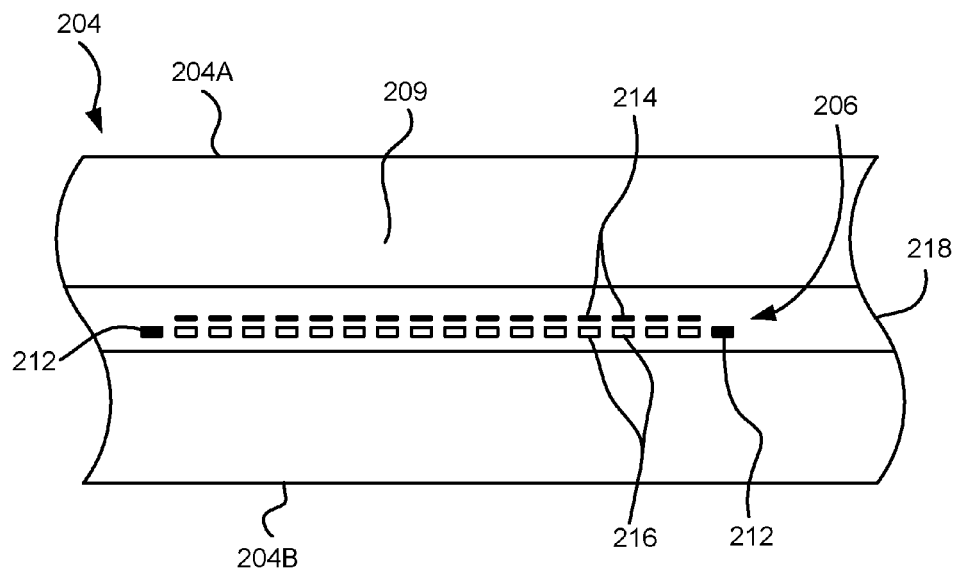
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
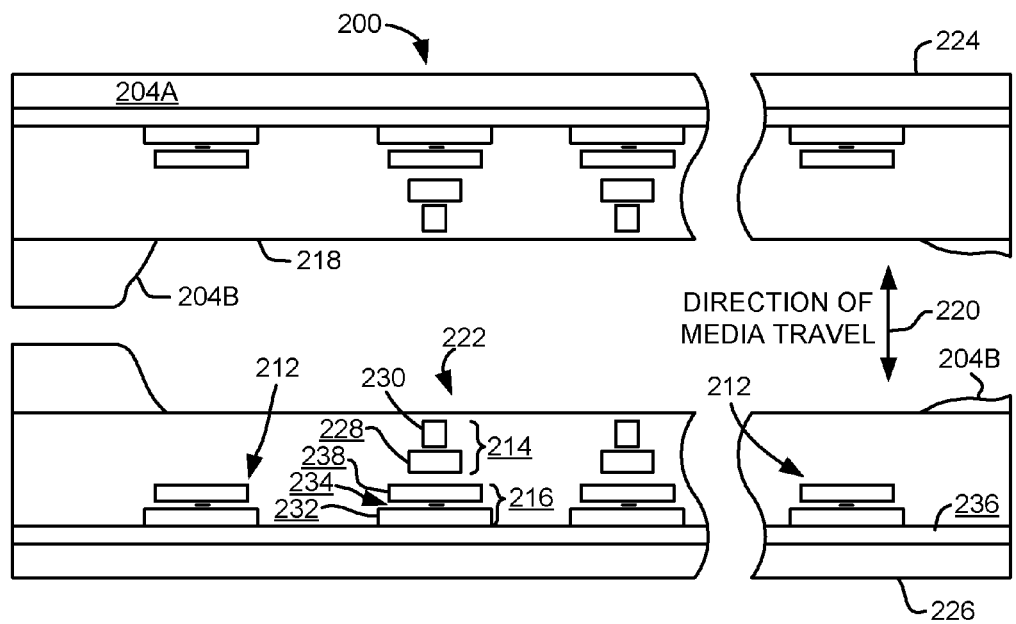
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
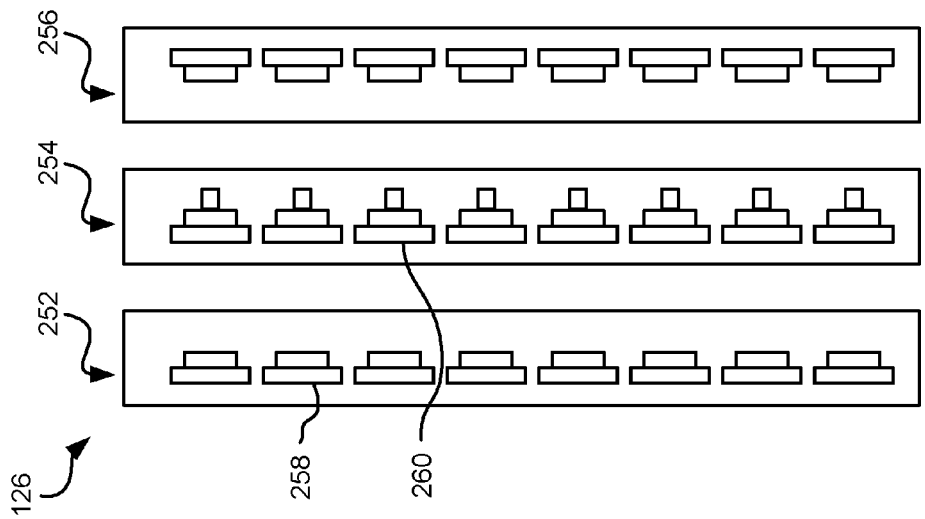
FIG. 4 is a partial tape bearing surface view of a magnetic head having a read-write-read configuration.
Figure 3:
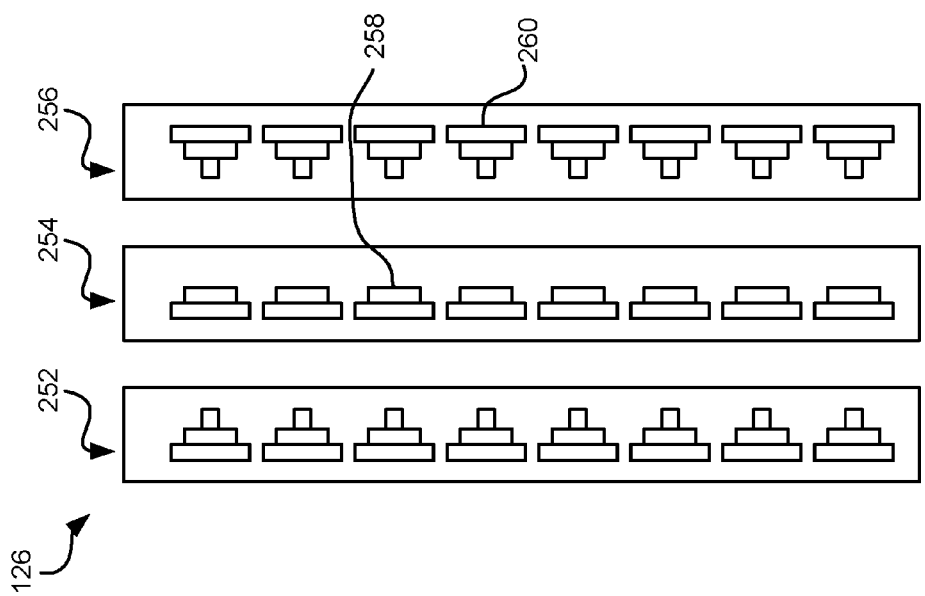
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
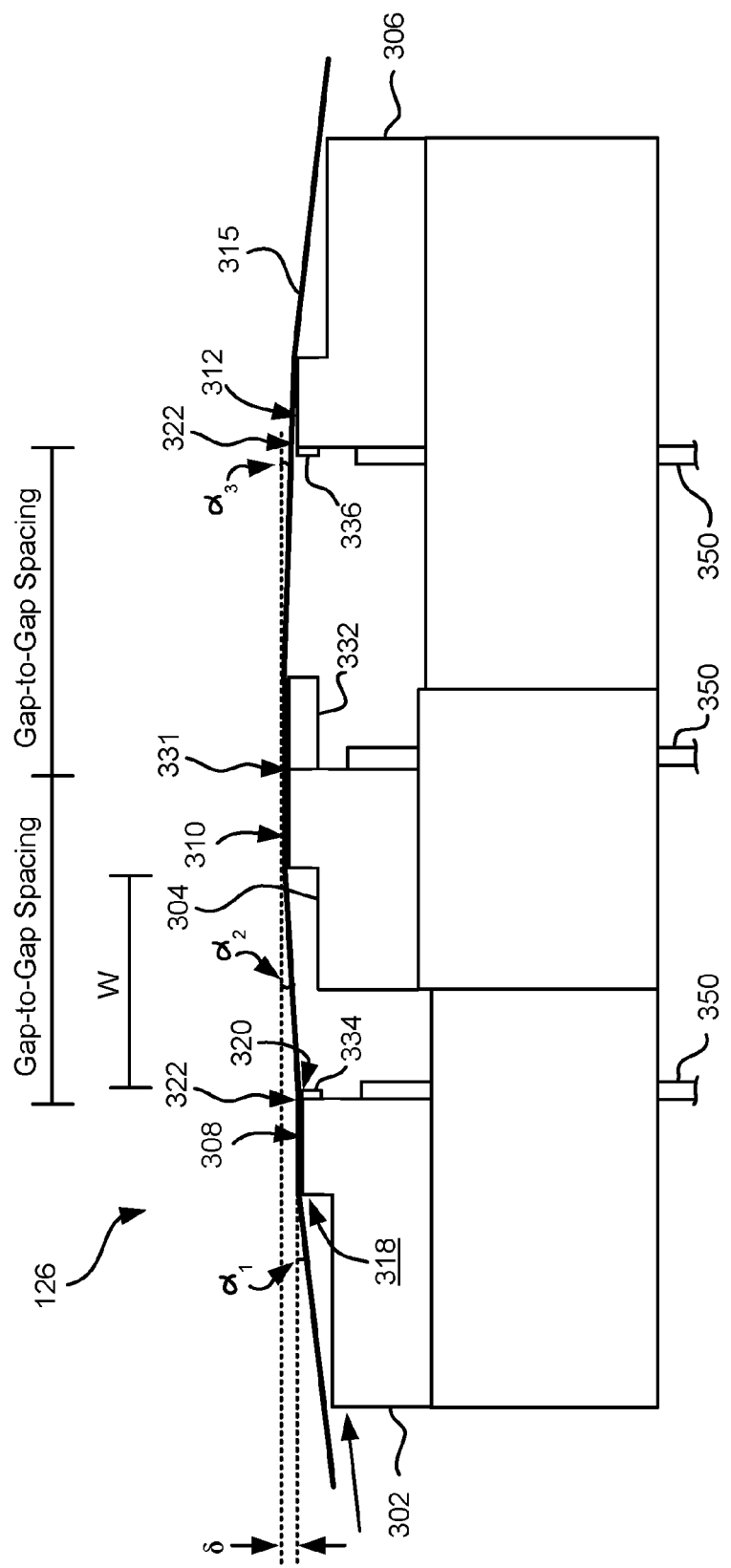
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
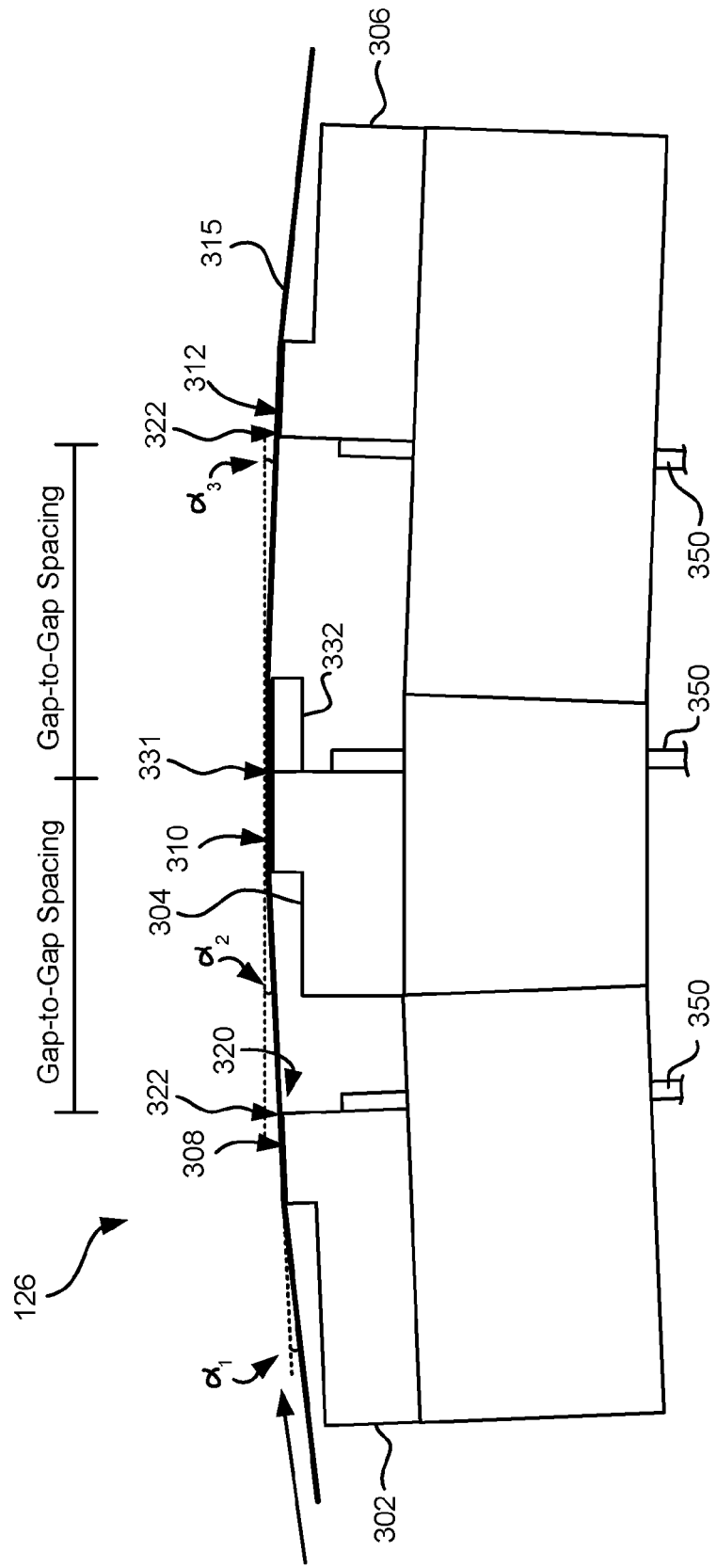
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
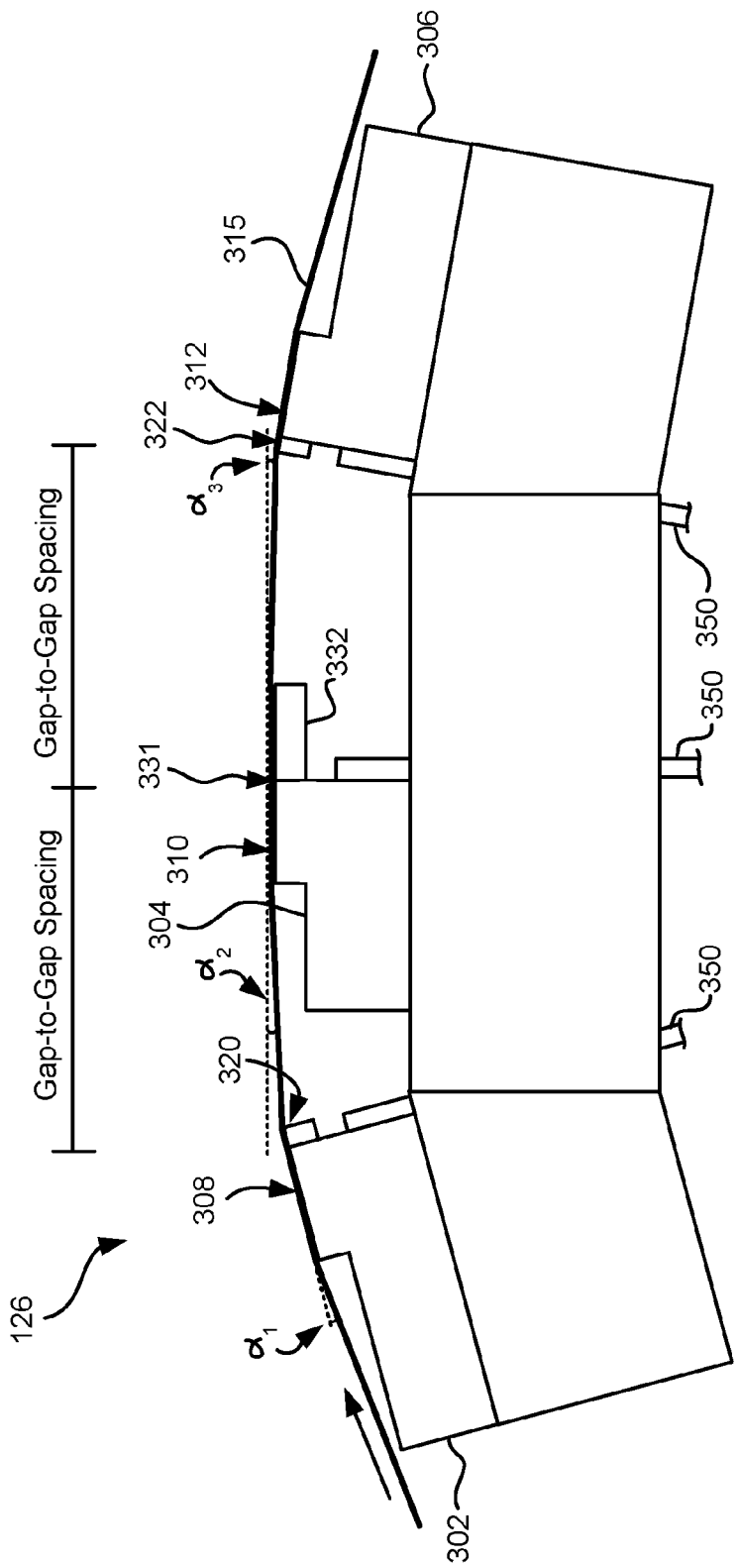
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Conventionally, limitations on areal density are imposed by loss of signal quality due to increase in head-media spacing resulting from head wear, or from deposits or other buildup on the head surface. A method used by the industry to improve such head wear includes pre-recessing and coating the magnetic head. However, pre-recession and coating increase magnetic spacing between the tape and the surface of the sensor and may limit achievable recording linear density.

Moreover, defects in the magnetic medium may cause shorting across the sensor. Conventionally, pre-recessed sensors with very hard coatings on the media bearing surfaces help mitigate wear and shorting due to defects in the magnetic medium passing over the sensor. However, under severe conditions, such as large defects embedded in the media, shorting may still occur in these heads. It would be desirable to be able to form a protective coating on the transducer during the process of running magnetic medium over the head. Since TMR sensors are not easily heated compared to GMR sensors, it would be ideal if the coating could be formed without the requirement of heat.

Various embodiments described herein describe an apparatus that has protective coatings specific to the sensors at the media bearing surface. In a preferred embodiment, a magnetic recording head has at least a TMR transducer having at least a magnetic shield comprised of nickel-iron. The shield is recessed relative to the insulation layers in the thin film region, as, for example, by a vacuum process in which the shield etches more rapidly than surrounding the insulating films in the thin film region. The coatings may be formed by a self-healing mechanism while the magnetic medium is run over the head.

FIGS. 8A-8D depict an apparatus 800, in accordance with one embodiment. As an option, the present apparatus 800 may be implemented in conjunction with features from any other embodiment listed herein, such as those described with reference to the other FIGS. Of course, however, such an apparatus 800 and others presented herein may be used in various applications and/or in permutations which may or may not be specifically described in the illustrative embodiments listed herein. Further, the apparatus 800 presented herein may be used in any desired environment.

Figure 8A:
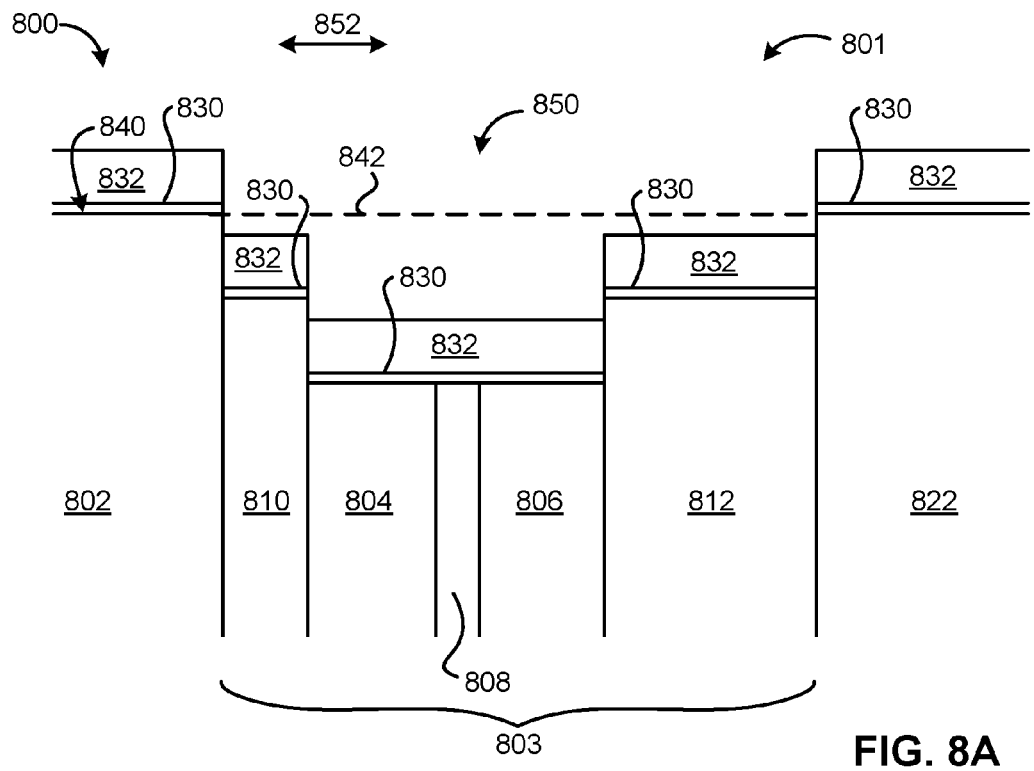
FIGS. 8A-8E are partial side views of a media facing side of a transducer structure according to one embodiment.

Referring to FIG. 8A, according to one exemplary embodiment, an apparatus 800 may include a substrate 802 having a media bearing surface 840 and a plurality of thin films formed on the substrate 802 in a thin film region. In one approach, the apparatus 800 may also include a closure 822. According to various approaches, the apparatus may include a tape head, a disk head, etc.

The film region 803 of the apparatus 800 include at least one transducer 801 formed therein.

In one approach, the at least one transducer 801 may include a sensor 808. In one approach, the sensor may include any of the sensors mentioned above, or any other sensor which would be apparent to one skilled in the art upon reading the present description.

Figure 8B:
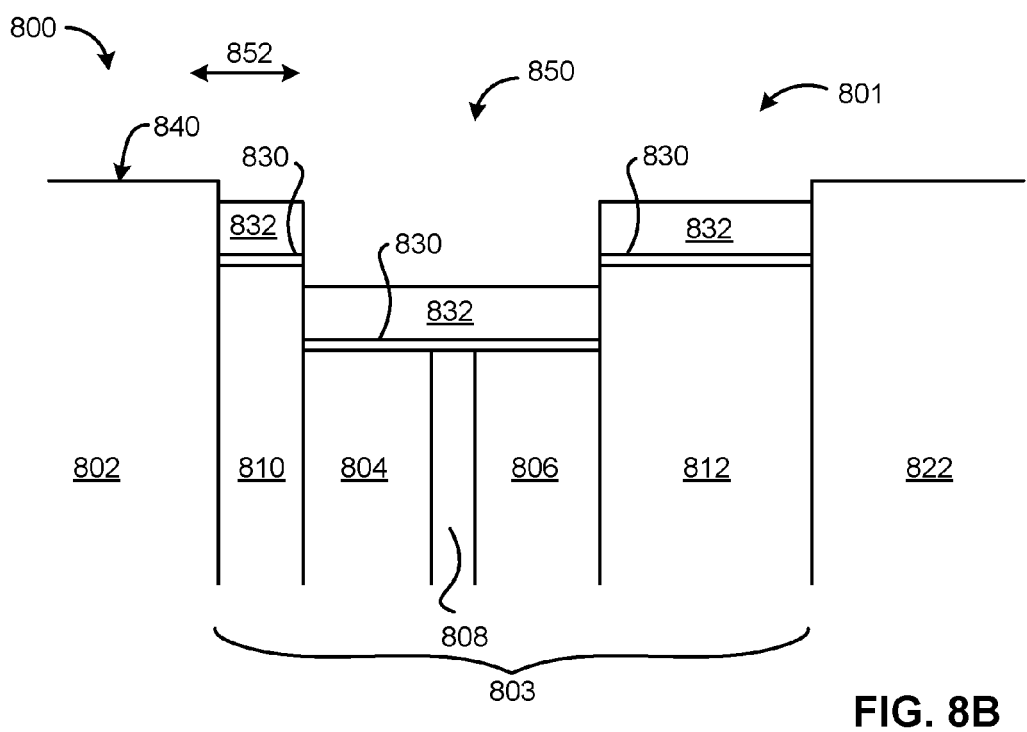

Although FIGS. 8A-8B illustrate only a single magnetic read transducer 801, apparatus 800 may include one or more additional magnetic read transducers on a remainder of a module, e.g., in an array such as in FIGS. 2B-4. Accordingly, the components and/or configurations of magnetic read transducer 801 may be incorporated in any magnetic read transducer described herein. Write transducers may also be present.

The magnetic read transducer 801 may be a current-perpendicular-to-plane sensor (CPP) 808, (e.g. such as a TMR sensor, CPP GMR sensor, etc.).

According to some embodiments, the sensor 808 may be configured as a data sensor for reading data tracks of a magnetic medium.

According to other embodiments, the sensor 808 may be configured as a servo pattern reading sensor of a servo reader. For example, the sensor 808 may be configured as a servo pattern reading sensor where apparatus 800 includes one or more arrays of data readers and/or writers and one or more servo track readers for reading servo data on a medium.

Looking to FIG. 8A, the apparatus 800 includes at least one, and preferably two magnetic shields 804, 806, and a sensor 808 within the thin film region 803. In addition, the thin film region 803 may include thin films such as insulative layers 810, 812. The thin films of the thin film region 803, including the magnetic shields 804, 806 and sensor 808, are pre-recessed using conventional methods used in the art, e.g., argon plasma sputtering, ion milling, etc. In some embodiments the shields 804, 806 may be recessed relative to the insulative layers 810, 812. In other approaches, the shields 804, 806 may be recessed to about the same extent as the insulative layers 810, 812.

In an exemplary embodiment, apparatus 800 includes a first shield 804 above the substrate 802, the first shield 804 having a media facing side 850 recessed from a plane 842 extending along the media bearing surface 840 of the substrate 802. As would be appreciated by one skilled in the art, first and second shields (also referred to as lower shield and upper shields) 804, 806 preferably provide magnetic shielding for the CPP (or CIP) sensor 808. Thus, one or both of the upper and lower shields 806, 804 may desirably include a magnetic material of a type known in the art, for example, nickel and iron, or for example CZT (alloy of cobalt, zirconium and tantalum) or for example Sendust.

Furthermore, the apparatus 800 includes a CPP sensor 808 that may be positioned above the substrate 802. The sensor 808 may have a media facing side 850 recessed from the plane 842 extending along the media bearing surface 840 of the substrate 802.

According to one embodiment, apparatus 800 has an electrically nonconductive first film 830 on the media facing sides 850 of at least the first shield 804 (i.e. lower shield) and sensor 808. In addition, the first film 830 may be preferably formed directly on the media facing sides 850 of the sensor 808 and shields 804, 806, but there may be one or more intervening layers present in some embodiments. Moreover, in some approaches, the first film 830 may serve as a seed layer for the second film 832, where the second film 832 maybe formed directly on the first film 830.

A first film 830 formed on the media facing side 850 of the sensor 808 may provide insulation between the media facing side 850 of the shields 804, 806 and the second film 832, and between the media facing side 850 of the sensor 808 and the second film 832 which may be electrically conductive. Moreover, the first film 830 may serve as an adhesion layer for the second film 832, e.g., to prevent delamination thereof. In one embodiment of apparatus 800, the first film 830 may include silicon. In another embodiment of apparatus 800, the first film 830 may include silicon nitride. The first film 830 of silicon nitride may be formed by sputtering silicon in a nitrogen atmosphere following conventional methods. In yet another embodiment of apparatus 800, the first film 830 may include aluminum oxide.

In various embodiments of apparatus 800, the first film 830 may have a thickness in a deposition direction thereof of greater than about 3 nm and less than about 10 nm. In one embodiment, the preferred thickness may at least about 5 nm.

According to one embodiment, the apparatus 800 includes a second film 832 on a media facing side 850 of the first film 830. The second film 832 may include one or more refractory metals, such as titanium, vanadium, chromium, zirconium, ruthenium, iridium, tantalum, tungsten, aluminum, and/or molybdenum; and/or alloys thereof. In some embodiments, the second film 832 may preferably include titanium. In other embodiments, the second film 832 may be substantially pure (>98 at %) titanium. In yet other embodiments, the second film 832 may include a titanium alloy comprising at least 70 at % titanium. In further embodiments, the second film 832 may include tantalum and/or tungsten. In yet other embodiments, the second film 832 may include titanium, tantalum and/or tungsten. In another embodiment, the second film 832 may include an alloy of titanium, vanadium and aluminum.

According to an exemplary embodiment of apparatus 800, the second film 832 may be preferably formed directly on the media facing side 850 of the first film 830, but there may be one or more intervening layers present in some embodiments. The second film may be formed by conventional methods, for example, target sputtering or chemical vapor deposition In some embodiments of apparatus 800, the second film 832 may be electrically conductive.

In various embodiments of apparatus 800, the second film 832 may have a thickness in a deposition direction thereof of greater than 0 nm and less than about 30 nm.

As shown in FIG. 8B, running magnetic media in the direction 852 of media travel over the apparatus 800 may reduce or remove films 830, 832 on the media supporting structures, i.e. substrate 802 and closure 822. In some embodiments and with some media, the films may be removed in a relatively short period of time, e.g. within a duration of a few hours. The loss of films 830, 832 on the substrate 802 and closure 822 reduces the magnetic spacing as the magnetic media runs closer to the thin films in the thin film region 803. Film 830 protects the sensor from shorting when the second film 832 is conductive.

Reduced magnetic spacing due to reduction or removal of films 830, 832 on the media bearing surface 840 of the substrate 802 and closure 822 may be followed by low level shorting across the thin film region 803. The inventors discovered a surprising and unexpected result with continued running of the media over apparatus 800. Low level (e.g., <15 ohms) shorting across the thin film region 803 tends to recover during continued running of the media, i.e. sensor resistance returns to or near to pre-shorting resistance values. This finding was especially surprising because normally, as spacing decreases, shorting has a tendency to persist or perhaps even worsen. Without wishing to be bound by any particular theory, the inventors believe that presence of the unique structure imparted by the first and second films 830, 832 is responsible for the unexpected recovery.

Figure 8C:
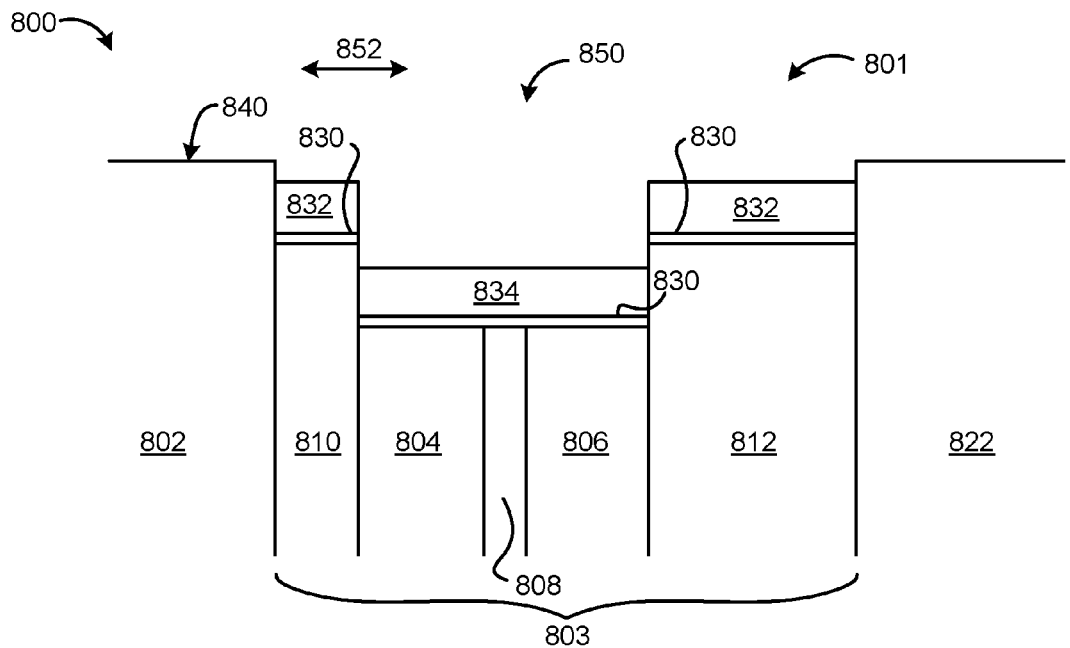

Moreover, as illustrated in FIG. 8C, during continuous running of the media over the apparatus 800, a third film 834 forms on the media facing side 850 of the shields 804, 806 and sensor 808 (difficult to resolve in AFM). The third film 834 continues to grow until the third film 834 is slightly higher than the media supporting structures, i.e. the substrate 802 and closure 822 (shown in FIG. 8D). Furthermore, and also surprising to the inventors, heat does not appear to be required for the formation of the third film 834. The third film 834 also may resist scratching by media defects thereby protecting TMR sensors from shorting, and/or other tribological effects.

Without wishing to be bound by any theory, the inventors believe that the presence of certain metals, such as titanium, in the second film 832 mediates the formation of the third film 834. Furthermore, the inventors believe the combination of titanium of the second film 832 and silicon nitride of the first film 830 on top of the iron in the shields 804, 806 may be involved in initiating a reaction with running of the magnetic media which may result in the formation of the third film 834 on the media facing side 850 of the shields 804, 806 and sensor 808. The third film 834 may not form on other thin films of the thin film region 803, nor on the substrate 802 nor on the closure 822. Characteristics of the magnetic media running over the apparatus 800 in the direction 852 of tape travel may also play an important role in the formation of the third film 834, for example, the motion of the media, the materials of the media, the tribology of the media, etc.

Figure 8D:
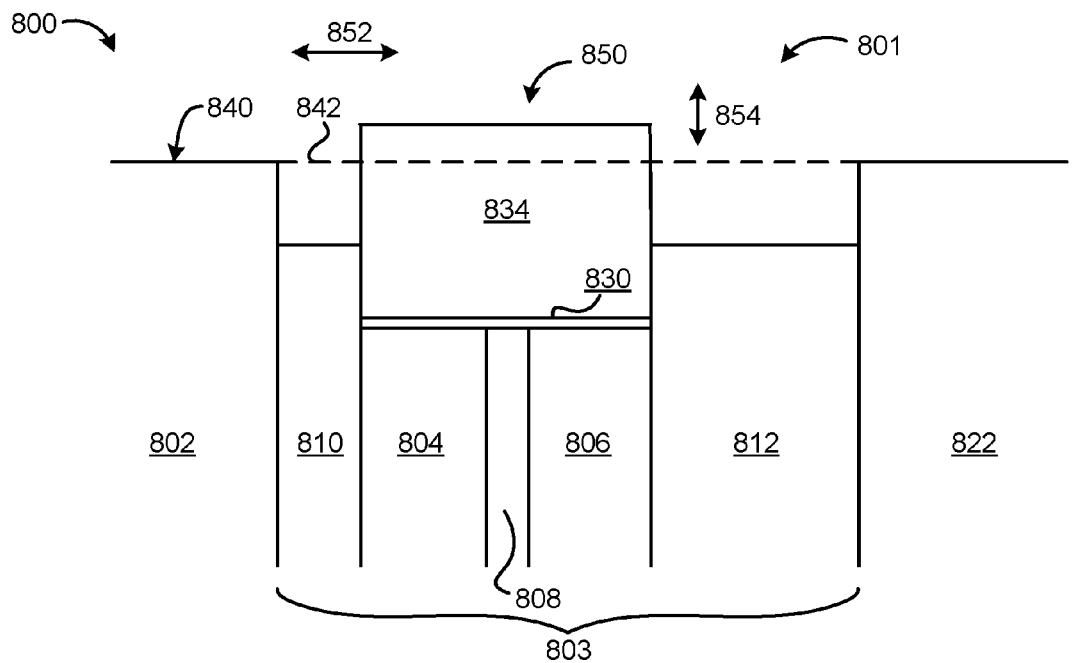
Figure 8E:
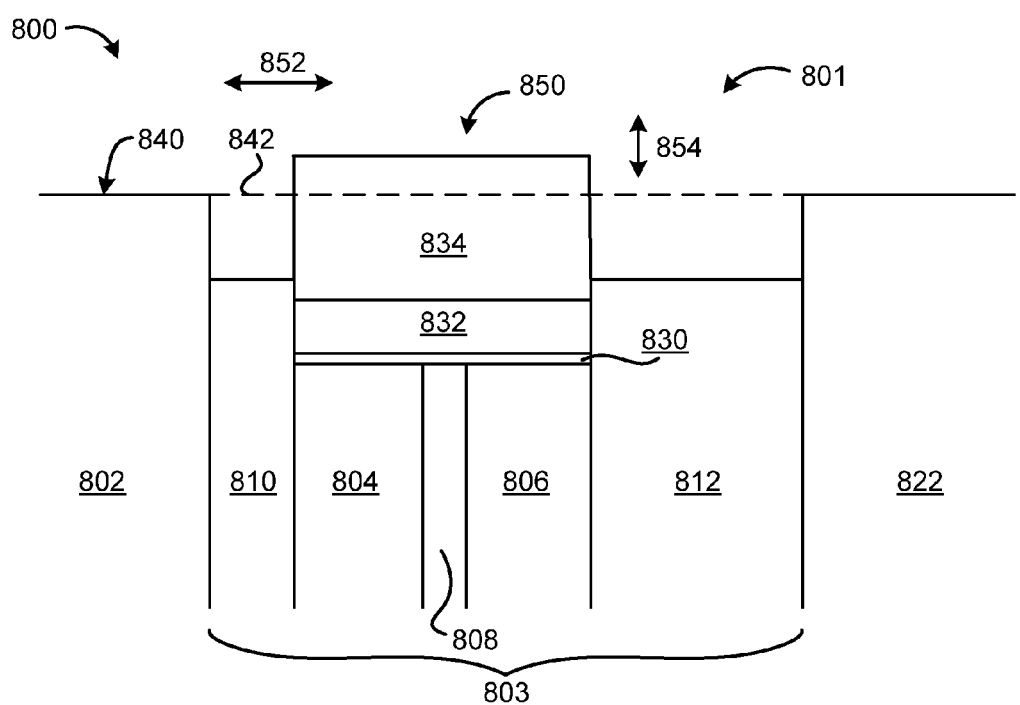

Looking to FIG. 8C, in some embodiments of apparatus 800, while the magnetic media is running the direction 852 of media travel over an apparatus 800 which includes a transducer 801, a third film 834 may form on the media facing side 850 of the first film 830. Moreover, as illustrated in FIGS. 8E and 8D, respectively, in some embodiments, the first film 830 and second film 832 may be partially or completely removed from the media facing sides 850 of the other thin films 810, 812 in the thin film region 803 while the third film 834 may form and/or remain on the shields 804, 806 and sensor 808. The third film 834 has a different composition than the second film 832. In various embodiments, the third film 834 may include components from the second film 832 and/or nickel iron from the shields 804, 806. In some approaches, the third film 834 preferably may include iron.

Looking to FIG. 8D, in an illustrative embodiment of apparatus 800, the third film 834 may grow to extend above the plane 842 extending along the media bearing surface 840 of the substrate 802 in a direction 854 orthogonal to the plane 842. In some approaches, the third film 834 may extend no greater than about 5 nm above the plane 842 extending along the media bearing surface 840 of the substrate 802 in a direction 854 orthogonal to the plane 842. The third film 834 may thus have a gradient in composition in direction 854, where the third film has a higher atomic concentration of one or more of the materials originally in the second film 832 in a region nearer the media facing sides 850 of the shields 804, 806 than it does in a region farther from the media facing sides of the shields 804, 806.

Without wishing to be bound by any theory, the inventors believe that the height of the third film 834 may not extend beyond about 3-5 nm above the plane of the media bearing surface 840 of the substrate 802 because there may be an equilibrium between the rate of formation of the third film 834 and the rate of removal of the second film 832 as well as possibly first film 830. These factors in addition to the height of the third film 834 may cause the third film 834 to cease thickening and stabilize at some height above the media bearing surface 840 of the substrate 802. Furthermore, the increase in magnetic spacing due to the added height of the third film 834 in direction 854 may have only a minimal impact on resolution as would normally be expected for spacing created by other coating methods.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
a substrate having a media bearing surface;
a first shield above the substrate, the first shield having a media facing side recessed from a plane extending along the media bearing surface of the substrate;
a current-perpendicular-to-plane sensor above the substrate, the sensor having a media facing side recessed from the plane extending along the media bearing surface of the substrate;
an electrically nonconductive first film on the media facing sides of the first shield and sensor; and
a second film on a media facing side of the first film, the second film comprising a refractory metal.

2. An apparatus as recited in claim 1, wherein the first film is a seed layer for the second film, the second film being directly on the first film.

3. An apparatus as recited in claim 1, wherein the first film comprises silicon.

4. An apparatus as recited in claim 1, wherein the first film comprises silicon nitride.

5. An apparatus as recited in claim 1, wherein the second film is electrically conductive.

6. An apparatus as recited in claim 1, wherein the second film comprises titanium.

7. An apparatus as recited in claim 1, wherein the second film is a titanium alloy comprising at least 70 at % titanium.

8. An apparatus as recited in claim 7, wherein the first film comprises silicon nitride.

9. An apparatus as recited in claim 1, comprising a third film on a media facing side of the second film.

10. An apparatus as recited in claim 9, wherein the third film comprises iron.

11. An apparatus as recited in claim 9, wherein the third film extends above the plane extending along the media bearing surface of the substrate in a direction orthogonal to said plane.

12. An apparatus as recited in claim 1, further comprising:
a drive mechanism for passing a magnetic medium over the sensor; and
a controller electrically coupled to the sensor.

13. An apparatus, comprising:
a substrate having a media bearing surface;
a first shield above the substrate, the first shield having a media facing side recessed from a plane extending along the media bearing surface of the substrate;
a current-perpendicular-to-plane sensor above the substrate, the sensor having a media facing side recessed from the plane extending along the media bearing surface of the substrate;
an electrically nonconductive first film on the media facing sides of the first shield and sensor;
a second film on a media facing side of the first film; and
a third film on a media facing side of the second film.

14. An apparatus as recited in claim 13, wherein the first film comprises at least one of material, the material being selected from a group consisting of silicon, aluminum oxide, and silicon nitride.

15. An apparatus as recited in claim 13, wherein the second film comprises a refractory metal.

16. An apparatus as recited in claim 13, wherein the second film comprises titanium.

17. An apparatus as recited in claim 13, wherein the second film is a titanium alloy comprising at least 70 at % titanium.

18. An apparatus as recited in claim 17, wherein the third film comprises iron.

19. An apparatus as recited in claim 17, wherein the third film extends above the plane extending along the media bearing surface of the substrate in a direction orthogonal to said plane.

20. An apparatus as recited in claim 13, further comprising:
- a drive mechanism for passing a magnetic medium over the sensor; and
- a controller electrically coupled to the sensor.

* * * * *